US007996679B2

United States Patent
Hsu et al.

(10) Patent No.: US 7,996,679 B2
(45) Date of Patent: Aug. 9, 2011

(54) SYSTEM AND METHOD FOR PERFORMING A TRUST-PRESERVING MIGRATION OF DATA OBJECTS FROM A SOURCE TO A TARGET

(75) Inventors: Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/243,560

(22) Filed: Oct. 5, 2005

(65) Prior Publication Data

US 2007/0079126 A1 Apr. 5, 2007

(51) Int. Cl.
*H04L 9/28* (2006.01)
*G06F 11/30* (2006.01)
(52) U.S. Cl. .................................. 713/176; 713/181
(58) Field of Classification Search .............. 713/176, 713/181, 194; 705/64, 71, 75
See application file for complete search history.

(56) References Cited

U.S. PATENT DOCUMENTS

| 5,535,188 | A | | 7/1996 | Dang et al. | |
|---|---|---|---|---|---|
| 5,553,019 | A | | 9/1996 | Sandvos et al. | |
| 5,787,175 | A | | 7/1998 | Carter | |
| 5,835,953 | A | * | 11/1998 | Ohran | 711/162 |
| 5,892,900 | A | * | 4/1999 | Ginter et al. | 726/26 |
| 6,199,052 | B1 | * | 3/2001 | Mitty et al. | 705/75 |
| 6,339,810 | B1 | | 1/2002 | Basham et al. | |
| 6,615,330 | B2 | | 9/2003 | Debiez et al. | |
| 6,724,554 | B1 | | 4/2004 | Braithwaite et al. | |
| 6,744,713 | B1 | | 6/2004 | Ko et al. | |
| 6,775,703 | B1 | * | 8/2004 | Burns et al. | 709/228 |
| 6,779,080 | B2 | | 8/2004 | Basham et al. | |
| 2002/0083095 | A1 | * | 6/2002 | Wu et al. | 707/513 |
| 2002/0194484 | A1 | * | 12/2002 | Bolosky et al. | 713/189 |

(Continued)

FOREIGN PATENT DOCUMENTS

EP 0 422 757 4/1991

(Continued)

OTHER PUBLICATIONS

Pavlovski C.; Boyd C.: Efficient Batch Signature Generation using Tree Structures, International Workshop on Cryptographic Techniques and ECommerce, CrypTEC'99, 1999, City University of Hong Kong Press, pp. 70-77, via http://sky.fit.qut.edu.au/ boydc/ papers/treefinal.ps.*

(Continued)

*Primary Examiner* — Nasser Moazzami
*Assistant Examiner* — Travis Pogmore
(74) *Attorney, Agent, or Firm* — Samuel Kassatly; Shimokaji & Assoc., P.C.

(57) ABSTRACT

A data migration system performs a tamper-resistant data migration for regulatory compliance systems. The system generates a secure hash for the data object, adds a timestamp to the hash, produces a signature for the data object using a private key, and includes the signature in a signature summary of data objects. Immediately prior to data migration, the system signs the signature summary of the set of data objects to be migrated. The signature of the data object maintains integrity of the data object by preventing undetectable modification to a data object during migration. The signed signature summary maintains completeness by preventing undetectable removal of a data object from or insertion of a data object into the set of data objects during migration.

24 Claims, 5 Drawing Sheets

U.S. PATENT DOCUMENTS

| | | | |
|---|---|---|---|
| 2003/0126446 | A1 | 7/2003 | Debiez et al. |
| 2003/0163718 | A1 | 8/2003 | Johnson et al. |
| 2005/0050342 | A1 | 3/2005 | Boivie et al. |
| 2006/0248596 | A1* | 11/2006 | Jain et al. .................. 726/27 |

FOREIGN PATENT DOCUMENTS

| | | |
|---|---|---|
| EP | 1 243 999 | 9/2002 |
| EP | 1 498 799 | 1/2005 |
| WO | WO 00/39659 | 7/2000 |

OTHER PUBLICATIONS

Santry et al., "Deciding when to forget in the Elephant file system," pp. 110-123, ACM 1999.

Cox, et al. "Pastiche: Making Backup Cheap and Easy," USENIX Association, 5th Symposium on Operating Systems Design and Implementation, pp. 285-298, 2002.

USPS Electronic Postmark (USPS EPM (R)), White Paper, 2003.

"CrytoCards—IBM eServer Cryptographic Hardware Products," downloaded from the WorldWideWeb at URL:http://www.ibm.com/security/cryptocards, on Jul. 20, 2005.

"IBM PCI Cryptographic Coprocessor," downloaded from the WorldWideWeb at URL: http://www.ibm.com/security/cryptocards/pcicc.shtml, on Jul. 20, 2005.

European Office Action dated Feb. 9, 2009.

International Search Report dated Dec. 4, 2006, International Application No. PCT/EP2006/066519.

* cited by examiner

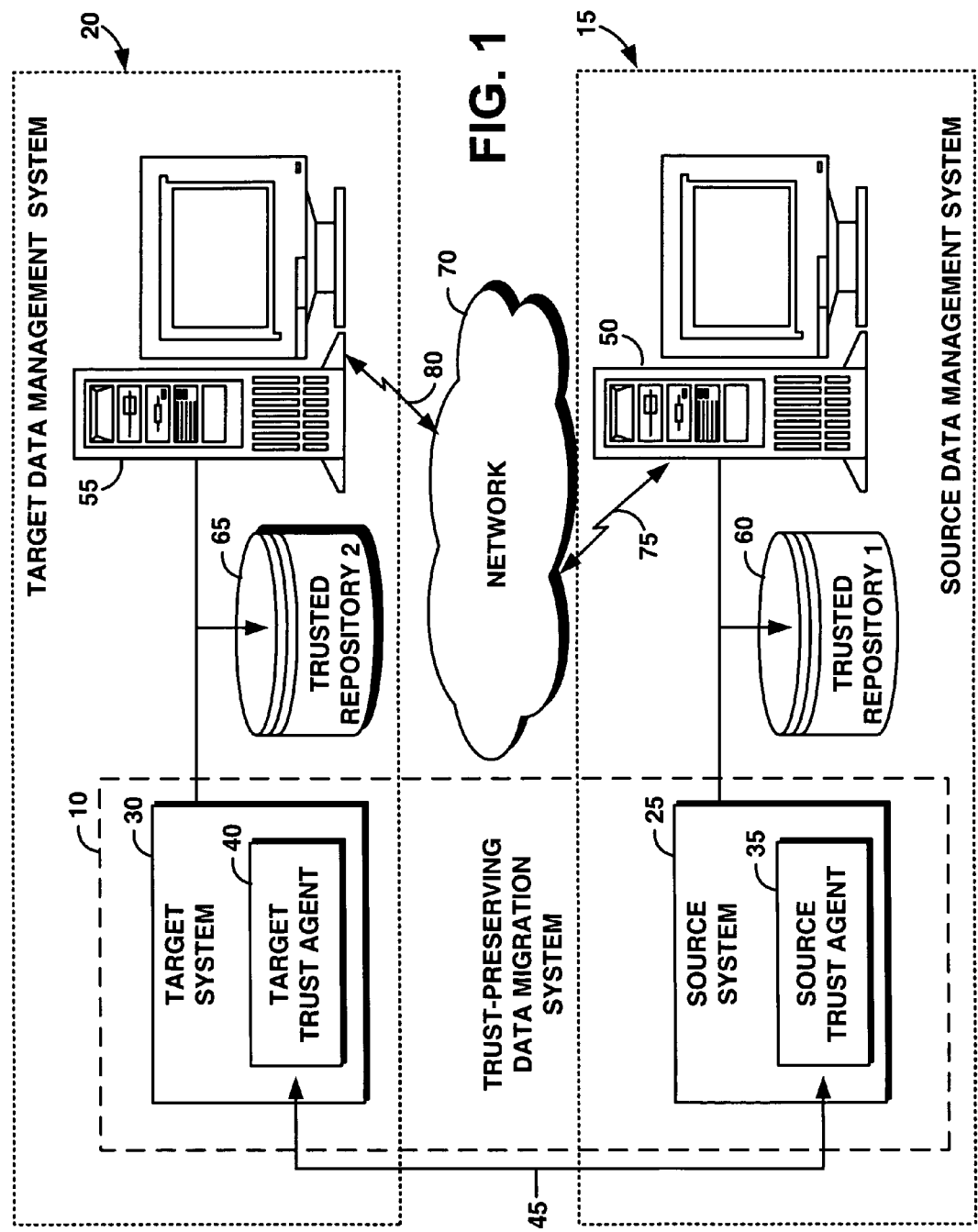

200

205
SOURCE DATA MANAGEMENT SYSTEM RECEIVES AND STORES AN INCOMING DATA OBJECT

210
SOURCE SYSTEM CALCULATES A HASH VALUE FOR THE INCOMING DATA OBJECT USING ATTRIBUTE(S) AND CONTENT OF THE INCOMING DATA OBJECT

215
SOURCE SYSTEM SUBMITS CALCULATED HASH VALUE TO THE SOURCE TRUST AGENT

220
SOURCE SECURE CHIP ISSUES A TIMESTAMP FOR THE INCOMING DATA OBJECT AND PRODUCES A SIGNATURE FOR THE INCOMING DATA OBJECT USING A PRIVATE KEY

225
SOURCE SECURE CHIP UPDATES A SUMMARY OF SIGNATURES TO INCLUDE THE SIGNATURE OF THE INCOMING DATA OBJECT

FIG. 2

SYSTEM AND METHOD FOR PERFORMING A TRUST-PRESERVING MIGRATION OF DATA OBJECTS FROM A SOURCE TO A TARGET

FIELD OF THE INVENTION

The present invention generally relates to trusted storage of data and in particular to transfer of data during data migration and replication in a manner that maintains integrity and completeness of data such that a required level of trust is maintained.

BACKGROUND OF THE INVENTION

An increasing number of government regulations are defining strict rules for management of electronic records. Some regulations, such as Securities Exchange Commission rule 17a-4, require that data to be stored in "non-erasable" and "non-rewritable" format.

Conventional WORM (Write Once, Read Many) media, such as optical disks and WORM tapes, have been used to satisfy long-term data retention requirements. These conventional WORM media can store unalterable data for decades. However, current performance and capacity requirements for reference data storage are exceeding capabilities of conventional WORM storage. Consequently, "WORM disk" storage solutions are being proposed in which inexpensive hard drives are used as the underlying storage media.

The read-once property of WORM storage prevents the data from being modified or erased. However, WORM storage, regardless of whether its WORM property is enforced electronically or through physical material, can only guarantee that data remain intact on the WORM storage where the data was originally placed. If the data is migrated or replicated to another trusted storage device, the trust is lost as data is at risk of modification during the transfer. Data migration and replication can occur during operations such as system upgrade or disaster recovery, and is often of critical importance in the storage strategy of an organization. Therefore, even though data is stored in trusted WORM storage, the trustworthiness of the data could still be placed at risk when data migration is needed, for example, when a system upgrade or disaster recovery is performed.

Unlike optical disks and WORM tapes that can store data for decades, the typical life span for hard disks is significantly shorter. Consequently, data migration or replication is likely to happen more frequently for compliance systems based on WORM storage using hard disks. Therefore, data stored on such systems is at a higher level of risk for losing its trustworthiness.

Due to the exposure of data to a risk of modification during data migration or replication, existing data retention solutions based on WORM storage are not sufficient to guarantee compliance with regulations such as Securities Exchange Commission rule 17a-4. In the context of data retention, the primary mission of an adversary is to hide or modify specific records that may be incriminating. Often, this adversary is an insider to a company and may be the owner or manager of the data. The adversary in this case often has the highest (executive) level of support and insider access, privilege, and knowledge. This "insider adversary" can be considered a super system administrator with physical access to the computer systems and the privilege to issue arbitrary commands to the systems.

In the case of maintaining data in a trustworthy fashion to satisfy federal regulations, a basic data objective of record keeping is not to prevent the writing of history, but to prevent the changing of history, i.e. changing records after they have been created. It is assumed that the process of creating records is trusted, because generally it is easier for an adversary with insider privilege to alter a data record before it is stored on WORM storage than afterwards. The adversary cannot destroy records in a blatant fashion (for example, by physically destroying the storage devices), because such destruction is easy to detect and could lead to severe penalties and a presumption of guilt. However, when an adversary or company comes under investigation, the adversary may initiate a spurious migration of records and attempt to modify selected records during the migration process.

A trusted data storage system is then required to secure data integrity and data completeness during data migration or replication. Securing data integrity ensures that data objects are not modified during the migration process. Securing data completeness prevents a removal of existing data objects or an insertion of new data objects during the migration process.

Both data integrity and data completeness have been widely studied in the area of computer security. For example, cryptographic algorithms such as encryption and secure signatures are often used to ensure data integrity for data transferred over insecure communication channels. However, such approaches are inadequate given an insider adversary primarily due to the scope of trust. For traditional secure storage systems, the owner of the data is typically trusted. In the case of ensuring data integrity to meet data retention requirements, the owners of the data and the system are often the same group of people who may benefit from tampering with the data. Consequently, it is very important to minimize the scope of trust in such a system.

In general, given a regulatory compliance system based on WORM storage, one may only trust data that is directly retrieved from the WORM storage. This limited scope of trust indicates that when cryptographic methods are applied, the owner of data cannot be trusted with the keys used to encrypt or sign the data.

There have been approaches proposed to address similar issues with limited scope of trust, such as electronic postmark. Although this technology has proven to be useful, it would be desirable to present additional improvements. Such approaches normally require the existence of some trusted third-party. Given the amount of liability such trusted third-parties carry, the trusted third-party is required to be both highly reliable and extremely secure. As a result, few such services have gained widely deployment.

What is therefore needed is a system, a computer program product, and an associated method for performing a trust-preserving migration of data objects from a source to a target. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for performing a trust-preserving migration of data objects from a source to a target. The present system comprises a tamper-resistant data migration and replication scheme for data retention systems. The term data migration refers to both migration and replication for conciseness.

The present system maintains integrity and completeness of data during data migration. The present system maintains integrity of data by preventing undetectable modification to data objects during migration. The present system maintains completeness of data by preventing undetectable removal of data objects or insertion of new data objects during migration.

The present system comprises a source system associated with a source data management system and a target system associated with a target data management system. Data objects are migrated in a trust-preserving migration from the source data management system to the target data management system.

The source system comprises a tamper-resistant source trust agent that stores a public key, a private key, and software for generating cryptographic signatures and storing a signature summary. As each data object is stored in the source data management system, the source system generates a secure hash through a cryptographic hash function for the data object using the content and attributes of the data object. The source trust agent assigns a timestamp for the data object and produces a signature based on the secure hash and the timestamp of the data object using the private key of the source trust agent. The source trust agent updates a summary value to include the signature of the data object.

The present system can manage data objects in a group, maintaining a summary value for those data objects in the group. There may be one or more groups in the trusted repository of a data management system. The present system may further migrate in a trust-preserving data migration only for those data objects in one or more of the groups.

When data objects are migrated from the source data management system to the target data management system, the source trust agent signs the summary value with the private key of the source trust agent. The source data management system sends the data objects in a transmitted group, signatures for the data objects, and the signed summary value of the transmitted group to the target data management system. The target system uses the signature of the data object and the public key of the source trust agent to verify the integrity of each data object. The target system verifies the completeness of the transmitted group by comparing a calculated summary value with the transmitted signed summary value. If the calculated summary matches the transmitted signed summary value, the completeness of the transmitted group is verified.

At any time after migration, the integrity of individual data objects can be verified by using the public key of the source trust agent to verify each data object against its signature, and the completeness of a transmission group can be verified by recalculating the summary value from all the data objects in the group and comparing the calculated summary value with the signed summary value from the source trust agent.

The source data management system receives data objects. For incoming data objects, the source system calculates hash values for the data objects, generates signatures for the data objects, and includes the signatures of the data objects in a summary value for at least some of the data objects in the data management system. The source system prepares a group of data objects (a transmitted group) for migration by signing the summary value of the transmitted group. The target data management system receives the transmitted group and the signed summary value.

The present system may be embodied in a utility program such as a trust-preserving data migration utility program. The present system provides means for the user to identify a trusted repository for which the trust-preserving data migration utility program preserves integrity and completeness of a set of data in the trusted repository. The present system provides means for the user to invoke the trust-preserving data migration utility program to generate a secure hash, a timestamp, and a secure signature for data objects as data objects are deposited in the trusted repository and to maintain summary values for sets of data objects in the trusted repository. The present system provides means for initiating a data migration or replication of a set of data objects from the trusted repository to a target trusted repository during which completeness of the set of data objects and integrity of the data objects are ensured. The present system further provides means for verifying the integrity of the data objects and the completeness of the set of data objects after migration.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 1 is a schematic illustration of an exemplary operating environment in which a trust-preserving data migration system of the present invention can be used;

FIG. 2 is a process flow chart illustrating a method of operation of the trust-preserving data migration system of FIG. 1;

DETAILED DESCRIPTION OF PREFERRED EMBODIMENTS

Figure 3A:
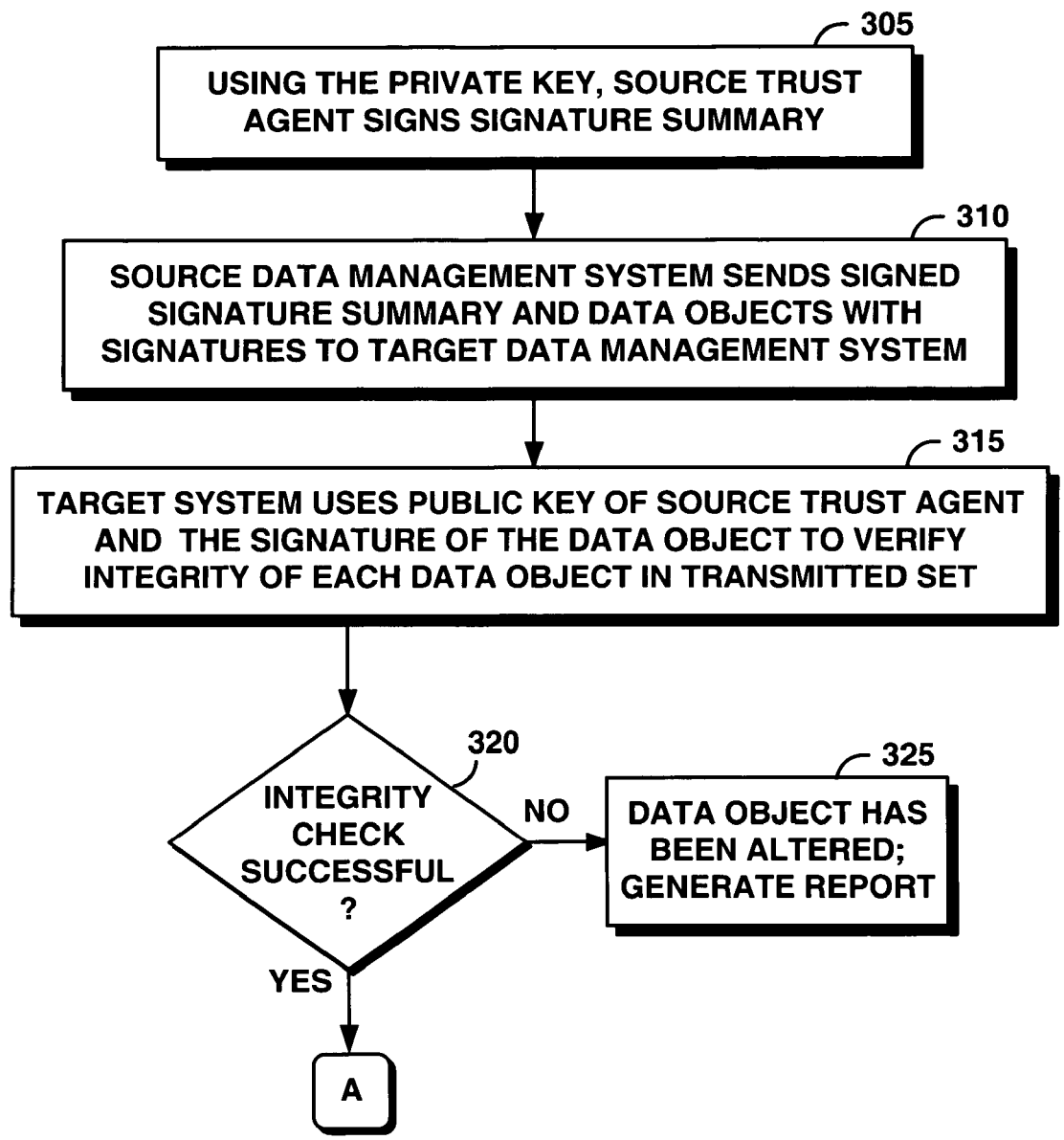
FIG. 3 is comprised of FIGS. 3A and 3B, and represents a process flow chart illustrating a method of operation of the trust-preserving data migration system of FIG. 1 in migrating data an a trust-preserving manner.

The following definitions and explanations provide background information pertaining to the technical field of the present invention, and are intended to facilitate the understanding of the present invention without limiting its scope:

Data Integrity: Referring to a data object; a data object exhibits integrity if the data object has not been altered.

Data Completeness: Referring to a set of data objects; a set of data objects is complete if the set is intact and unaltered; i.e., data objects have not been removed from or added to the set of data objects.

FIG. 1 portrays an exemplary overall environment (a data management system 100) in which a system, a computer program product, and an associated method (the "system 10") for performing a trust-preserving migration of data objects from a source (a source data management system 15) to a target (a target data management system 20) according to the present invention may be used.

System 10 comprises a source system 25 and a target system 30. The source system 25 and the target system 30 each comprise at least one trust agent. The source system 25 comprises a source trust agent 35. The target system 30 comprises a target trust agent 40. The source trust agent 35 and the target trust agent 40 are collectively referenced as trust agents 45. System 10 further comprises a software programming code or a computer program product that is typically embedded within, or installed on a computer such as a source computer 50 or a target computer 55. Alternatively, software components of system 10 can be saved on a suitable storage medium such as a diskette, a CD, a hard drive, or like devices.

Data objects in the source data management system 15 are stored in a trusted repository 1, 60. Data objects are migrated to a trusted repository 2, 65 in the target data management system 20 through a network 70. Computers 50, 55 are connected to network 70 via communications links 75, 80 respectively. While system 10 is described in terms of network 70, computers 50, 55 may communicate locally rather than remotely.

The trust agents 45 are secure subsystems. In one embodiment, the trust agents 45 are implemented using tamper-proof sealed devices, for example, secure cryptographic coprocessors (also called secure chips). Such secure chips each comprise a processor, a secure memory storage, and hardware support for cryptographic functions. Secure chips achieves a high degree of tamper resistance through a packaging of multiple physical security measures. Critical information stored in secure chips will be automatically erased in the event of tampering.

In one embodiment, additional trust agents are used in the source system 25 and the target system 30 to prevent the source trust agent 35 and the target trust agent 40 from becoming a single point of failure or bottleneck in system 10.

It is to be understood that even though the trust agent in source system 25 and the trust agent in target system 30 are denoted as source trust agent 35 and target trust agent 40 respectively for illustrative purposes, the same trust agent in a data management system such as data management system 15 or 20 can be used as either a source trust agent or a target trust agent, depending on whether the data management system is the source or the target of a data migration.

During manufacture of system 10, the trust agents 45 are initialized. Each trust agent generates a private key and a public key during the process of initialization. The keys are generated based on input from a random number generator in each of the trust agents 45. The private keys are stored inside the secure memory area of the trust agents 45 and are never disclosed to the outside world. Consequently, no one, including the manufacturer of system 10, is able to obtain the private keys.

The public keys can be retrieved from the trust agents 45. The manufacturer of the system 10 publishes the public keys of all the systems that have been manufactured (e.g., on a public website of the manufacturer or reputable newspapers) so that the information is widely available. This discourages an adversary from building a "clone system" that mimics the interfaces of a compliance system but allows the data stored to be modified. Such a clone system can easily be detected because the published and widely accessible list of public keys is difficult to alter.

FIG. 2 illustrates a method 200 of operation of system 10. The source data management system 15 receives an incoming data object and stores the data object in the trusted repository 1, 60 (step 205). The source data management system 25 calculates a secure hash (e.g., MD5 or SHA1) for the incoming data object using the content and one or more attributes of the data object. The calculation of the secure hash can be done outside the source trust agent 35 (for example, by the source computer 50), because it is easier for an adversary to simply insert a different data object into the source data management system 15 than to tamper with the software that generates the secure hash.

The source system 25 submits the calculated hash value of the incoming data object to the source trust agent 35 (step 215). The source trust agent 35 issues a time stamp for the data object and produces a signature for the incoming data object using the private key of the source trust agent 35 based on the calculated hash value and the time stamp (step 220). The time stamped signatures generated by the source trust agent 35 enable verification that the content of each data object is not altered during data migration. The time stamped signatures further enable verification of the time at which each data object is created in or deposited into trusted repository 1, 60. In comparison, conventional WORM media such as optical disks provide no information regarding when each data object is created or stored. Even if the WORM storage does have the ability to record when data was written, this information is of limited use without assistance from a trust agent. For example, a time stamp assigned by the WORM storage in the trusted repository 2, 65 for a data object migrated from the trusted repository 1, 60 can only assert when the data object is migrated and not when the data object was created.

The source trust agent 35 maintains a summary value of signatures for all incoming data objects in a group (step 225). The summary value is calculated using a mathematical function that ensures it is practically infeasible to generate the same summary value for a different group of data objects. The summary value of the signatures provides verification for the exact set of data objects in a group that a trusted repository such as the trusted repository 1, 60, comprises at a particular moment. If an adversary attempts to replace a data object, remove a data object, or add a data object during migration, the signature summary changes, indicating that the data set has been altered. Details about signature summary will be discussed later.

When a data object is migrated from, for example, the source data management system 15 to the target data management system 20, target system 30 uses the signature issued by the source trust agent 35 for each migrated data object to verify the integrity of the data object. After being migrated from the source data management system 15 to the target data management system 20, the data object may later be migrated to other data management systems. System 10 verifies the migrated data objects by the signature issued by the source trust agent 35 when the data object is originally created or stored. The target trust agent 40 does not generate a new signature for the data objects during the migration process, instead assuming that the source trust agent 35 on the source system 25 can be as equally trusted as the target trust agent 40 on the target system 30.

In one embodiment, the hash values of incoming data objects are grouped together and then periodically time stamped and signed by the source trust agent 35 in batches. Depending on the time interval between the batches, the load on the source trust agent 35 can be significantly reduced. This approach introduces extra delay between the timestamp issued for a data object by the source trust agent 35 and the actual creation time of the data object in the trusted repository 1, 60.

Having the source trust agent 35 sign data objects in batches implies that all the data objects in the batch share a signature. Consequently, verification of an individual data object requires the signature and the hash values of all the data objects in the same batch. If the hash values are organized as a linear list, the overhead for verifying the data object is proportional to the number of data objects in the batch. In one embodiment, the hash values are organized in a hierarchical tree structure, where each node contains a hashed value for all the hash values stored in child nodes of that node. Only the root of the tree requires a signature from the source trust agent 35. In this embodiment, a data object can be verified by computing $O(\log(N))$ hash values where N is the total number of data objects in the batch.

In the data management system 10 and 20, only the source trust agent 35, the target trust agent 40, the trusted repository 2, 60, and the trusted repository 2, 65 are required to be trusted. The source trust agent 35 and the target trust agent 40 run a minimal set of verified codes. The remaining software in the source system 25 runs outside the source trust agent 35; the remaining software in the target system 30 runs outside the target trust agent 40. Limiting the trusted components in the system to only the trust agents and trust repository allows the system to achieve a high degree of security and flexibility.

An adversary may attempt to gain control over the part of the software on the source system 25 that manages the migration of data objects with the purpose of hiding some of the data objects from the data migration. To prevent this attack, a software code inside the source trust agent 35 maintains an up-to-date summary of the signatures of every data object that has been signed by the source trust agent 35. This signature summary is generated and maintained completely inside the source trust agent 35 and is accumulated over time as data objects are added to the trusted repository 1, 60. Consequently, the signature summary can be trusted to comprise the hash of all the data objects that are in the trusted repository 1, 60.

In one embodiment, the summary value of signatures is a mathematical sum. Using a mathematical sum of the signatures provides low overhead calculation for maintaining the summary of signatures, reducing the risk of creating a bottleneck at the source trust agent 35. In another embodiment, other mathematical functions for calculating a summary of the signatures can be used. It is preferred that the mathematical function is commutative so that the calculation of the summary of signatures can be performed in any order and in parallel. A mathematical sum is one example of a commutative function.

Figure 3B:
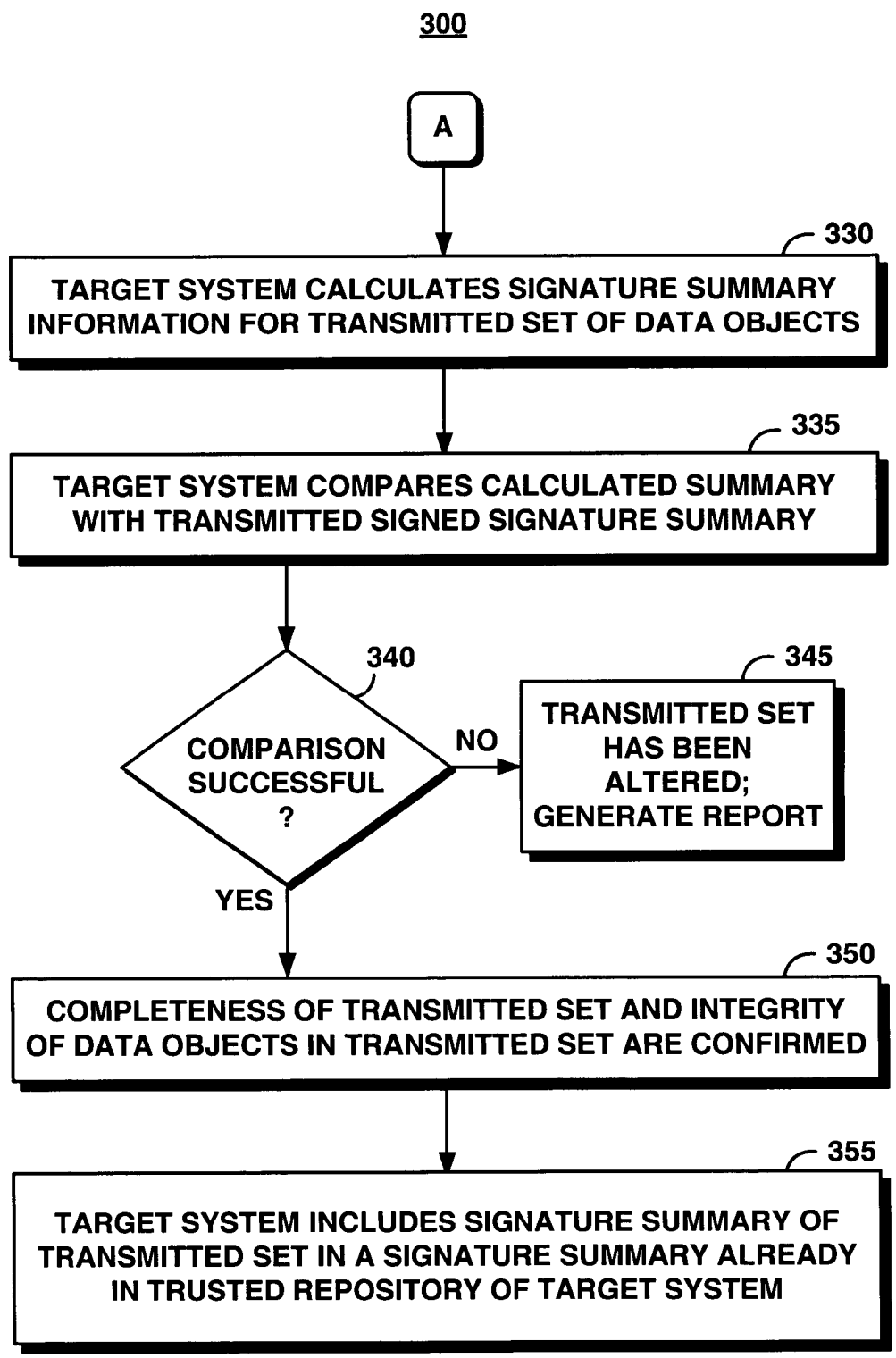

FIG. 3 illustrates a method of system 10 in migrating data from the source data management system 15 to the target data management system 20. Using its private key, the source trust agent 35 signs the signature summary of the data objects to be migrated (step 305). The source data management system 15 sends the signed signature summary, the data objects to be migrated, and signatures for the data objects to be migrated to the target data management system 20 (step 310). Some or all of the data objects in the source data management system 15 can be migrated to the target data management system 20. In one embodiment, the trusted repository 2, 65, is divided into groups, for example, LUNs [Logical Unit Numbers], and a signature summary is maintained for each group. Consequently, completeness can be verified on a group-by-group basis.

The target system 30 uses the public key of the source trust agent 35 and the signature of the data object to verify the integrity of each data object (step 315). The target system 30 determines whether the integrity check was successful (decision step 320). If not, the data object for which the integrity check failed has been altered; the target system 30 generates a report (step 325).

The target system 30 calculates a signature summary for the transmitted data objects (step 330). Verifying that each incoming data object is signed by a trust agent and that the data object remains unmodified only verifies the individual data objects. An adversary may remove individual data objects or even entire collections of data objects during the data migration. To ensure data completeness, the target system 30 verifies that the exact set of data objects in a transmitted group are received by the target data management system 20 by comparing the calculated signature summary with the transmitted signature summary which is signed by the source trust agent 35 (step 335).

The calculated signature summary matches the transmitted signature summary if all the data objects in the transmitted set have migrated intact, with no added, replaced, or removed data objects. If the comparison is successful (decision step 340), the calculated signature summary matches the transmitted signature summary. If not, the transmission set has been altered and the target system 30 generates a report (step 345). If the comparison is successful, the completeness of the transmitted set and the integrity of each of the data objects in the transmitted set are confirmed (step 350). The target system 30 includes the signature summary of the transmitted set with a signature summary of any data objects already in the target trust agent 40 (step 355).

To verify the completeness of the transmitted set and the integrity of each of the data objects in the transmitted set any time after the migration, an examiner can perform step 315 through step 355 of method 300 in a post-migration verification process. The post-migration verification process can be performed on a transmitted set of data objects any time after the migration has occurred.

Since data objects whose retention periods have already expired may be removed or shredded from the source data management system 15, it is possible that before a data migration, some data objects in a migration set may no longer exist in the source data management system 15. To determine whether a data object is missing due to legitimate shredding or malicious tampering, the source system 35 retains the signature of a data object even after the data object is shredded. During a data migration, all signatures for data objects that ever existed on the trusted repository 1, 60 in a transmitted set, are sent to the target system. To prevent an adversary from claiming a data object as shredded before the retention period of the data object actually expires, each signature contains additional fields for retention information which can be verified using the public key of the source trust agent 35. This allows the target system 30 to verify during a data migration whether a received signature represents a data object which might already been deleted or shredded. In one embodiment, the source trust agent 35 maintains a signature summary of those data objects that have been shredded. In another embodiment, the source trust agent 35 maintains a signature summary comprising hashes for shredded and current data objects.

The content and other attributes (except for retention information) of a data object cannot be recovered from the signature of the data object; therefore, keeping such information does not violate the requirements of shredding. Moreover, information such as the retention information about each data object may already be retained in the audit logs of a data retention system, as required by many regulations.

To skip data objects that were deposited after the previous migration session, an adversary may attempt to reuse a signed signature summary saved from a previous migration session. This attack can be carried out without hacking into the source data management system 15 provided the adversary can eavesdrop on communication link 75 or communication link 80. To prevent this attack, system 10 prevents the signature summary from being replayed. Replay prevention can be achieved through a challenge-response protocol. At initiation of a data migration procedure, a challenge is generated by the target trust agent 40 on the target system and sent to the source trust agent 35.

The challenge may comprise a random value. The challenge is time-stamped and signed by the target trust agent 40. After receiving the challenge, the source trust agent 35 generates a response that comprises the challenge and the current signature summary for the data objects. The response, time-stamped and signed by the source trust agent 35, is returned to the target system 30. This challenge-response protocol protects against a replay attack and provides a means to calibrate the clocks on the source trust agent 35 and the target trust agent 40.

Figure 4:
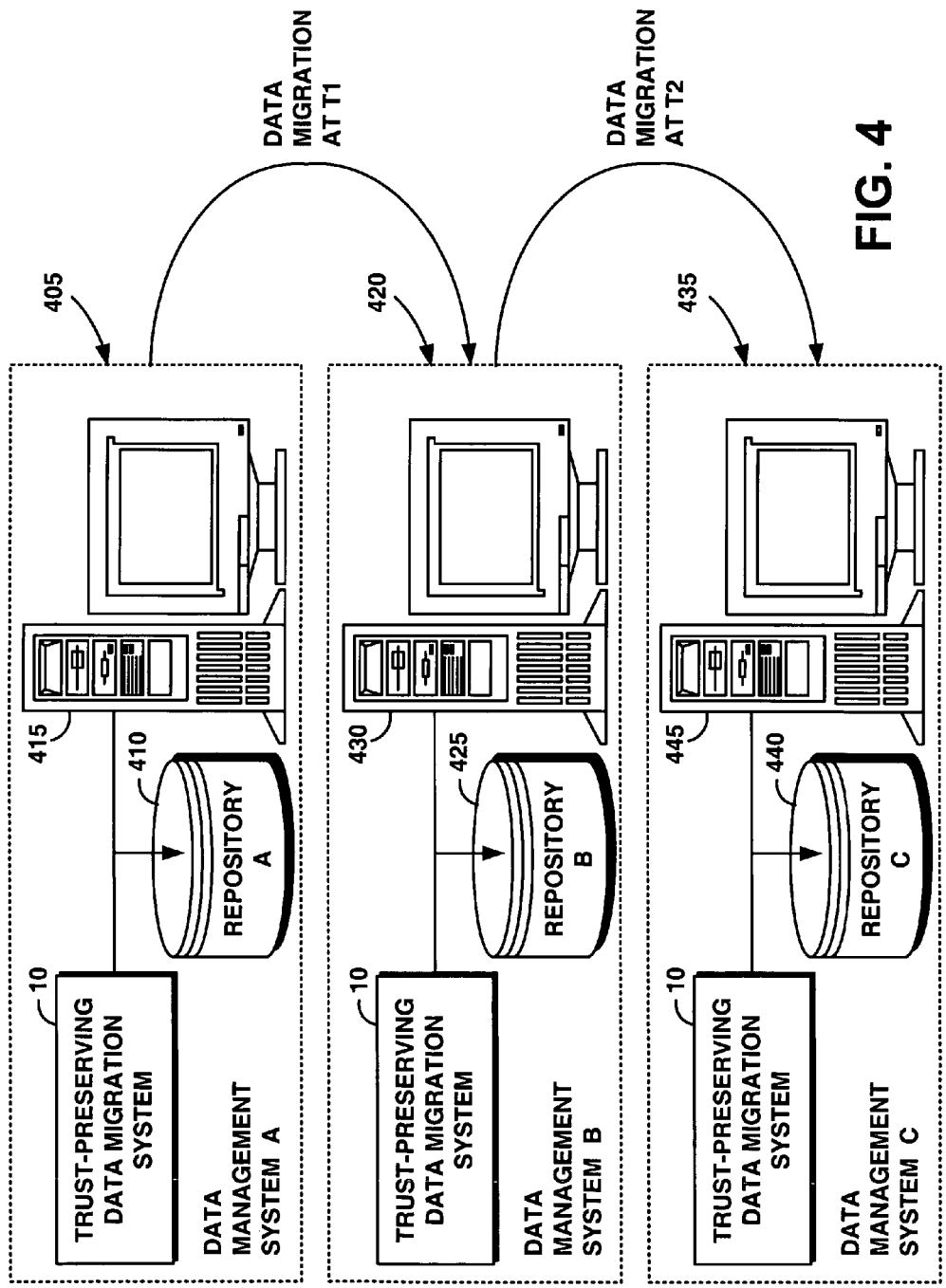
FIG. 4 is a diagram illustrating additional data migrations and sets of data accumulated by the trust-preserving data migration system of FIG. 1.

As illustrated by FIG. 4, System 10 ensures data completeness during migration even when data is migrated more than once or migrated through more than one data management system. As shown in FIG. 4, a data management system A, 405, comprises system 10, a repository A, 410, and a server 415. A data management system B, 420, comprises system 10, a repository B, 425, and a server 430. A data management system C, 435, comprises system 10, a repository C, 440, and a server 445.

At a time T1, data objects on the data management system A, 405, are migrated to the data management system B, 420. At some later time, T2, data objects on the data management system B, 420, are migrated to the data management system C, 435. In this example, the data management system B, 420, comprises one or more data objects prior to the migration at T1. The data management system B, 420, further continues to receive data objects during and after the migration at T1. For the reason of simplicity, in this example, all the data objects on the source data management systems are migrated during each data migration, and no other data migration exists except for the ones shown in FIG. 4.

System 10 ensures that at time T2, the data completeness guarantee is not violated for data migrated from the data management system A, 405, to the data management system B, 420. Further, system 10 ensures that at time T2 the data completeness guarantee is not violated for data deposited directly into the repository B, 425. To ensure the data completeness guarantee, the target trust agent 40 in the data management system B, 420, issues a timestamp and signs the signature summary provided by the source trust agent 35 in the data management system A, 405, during the migration at T1. To ensure completeness of future migrations, the signature summary is "remembered" by the target trust agent 40 on the target system 30 of the data management system B, 420.

Using the above example, after data migration to the data management C, 435, repository C, 440, comprises all data objects (including signatures of those already shredded) that existed on data management system B, 420, at time T2. Among these data objects, data objects originally on data management system A, 405, which are migrated to data management system B, 420 at time T1, are signed and time stamped by the source trust agent 35 of the data management system A, 405. The rest of the data objects from data management system B, 420, which are not migrated from data management system A, 405 at time T1, are signed and time stamped by the source trust agent 35 of the data management system B, 420.

After data migration to the data management C, 435, repository C, 440, further comprises data objects directly deposited in data management system C, 435. Each of these data objects is signed and time stamped by the source trust agent 35 of the source system 25 of the data management system C, 435.

After data migration to the data management C, 435, source trust agent 35 of the data management system C, 435, comprises the signature summary of the data objects migrated from the data management system A, 405, signed and time stamped at T1 by the source trust agent 35 of the data management system A, 405, and also signed and time stamped at T1 by the target trust agent 40 of the data management system B, 420.

After data migration to the data management system C, 435, source trust agent 35 of the data management system C, 435, further comprises the signature summary of data objects on data management system B, 420, at T2, signed and time stamped at T2 by the source trust agent 35 of the data management system B, 420, and also signed and time stamped by the target trust agent 40 of the data management system C, 435. This signature summary includes the signature summary of the data objects migrated from the data management system A, 405, at time T1.

After data migration to the data management system C, 435, the signature summary maintained by the source trust agent 35 of the data management system C, 435 now includes the signature summary of the data objects migrated from the data management system B, 420, at time T2.

System 10 does not require maintenance of more than one signature or timestamp for each data object if the data object is migrated through more than one data management system. The original signature, i.e., the one signed by the source trust agent on the original data management system where the data object was originally deposited, is kept with the data object because only the original signature can verify the creation time of the data object. It is not necessary to have the target trust agent 40 on the target system 30 to sign each individual data object again during a data migration because all the trust agents (whose public keys are published as mentioned above) are considered equally trusted.

It is to be understood that the specific embodiments of the invention that have been described are merely illustrative of certain applications of the principle of the present invention. Numerous modifications may be made to the system and method for performing a trust-preserving migration of data objects from a source to a target described herein without departing from the spirit and scope of the present invention. Moreover, while the present invention is described for illustration purpose only in relation to a trust agent, it should be clear that the invention is applicable as well to, for example, a secure provider that provides the same function as the trust agent.

What is claimed is:

1. A computer processor-implemented method for migrating data objects from a source system to a target system, comprising:

maintaining secure summary information of the data objects, including past and current data objects, comprising hashes, at the source system;

grouping together hash values of the migrating data objects using the computer processor;

signing the hash values of the migrating data objects in batches;

receiving a request to migrate the data objects to the target system;

sending the data objects from the source system to the target system;

sending the maintained secure summary information from the source system to the target system;

adding a secure subsystem to prevent a bottleneck;

creating a summary of signatures for the migrating data objects, that are signed and maintained by a trust source agent;

using a mathematical function to generate a unique value for the summary of signatures for a group of the migrating data objects;

calculating a summary information of the data objects received at the target system;

comparing summary information from past and present data objects with a public key for verifying integrity of the past and present data objects; and comparing the calculated summary information with the secure summary information received at the target system, to verify the integrity and completeness of the data objects received at the target system; and preventing the secure summary information from being replayed, and calibrating clocks on the source system and target system, by sending a time-stamped, challenge and response protocol communication between the source system and the target system.

2. The method of claim 1, wherein the secure summary information maintained at the source system is a function of a signature of the data objects covered by the summary information; and wherein the signature of each object of the data objects is based on at least a secure one-way hash of a content and associated attributes of the object.

3. The method of claim 1, wherein the secure summary information is maintained inside at least one secure subsystem in the source system so that the secure summary information is protected from tampering even if the content of the source system, other than the secure subsystem, is compromised.

4. The method of claim 1, wherein the summary information for the data objects received by the target system is included in a system secure summary information on the target system for subsequent migration of data from the target system.

5. The method of claim 1, wherein the data objects at the source system are partitioned into groups; and wherein a separate secure summary information is maintained for each group.

6. The method of claim 1, wherein the secure summary information maintained at the source system is calculated cumulatively as data objects are added.

7. The method of claim 2, wherein the secure summary information maintained at the source system covers the signature for each data object no longer present on the source system.

8. The method of claim 2, wherein the secure summary information maintained at the source system is signed using a secret key, and is verified using a corresponding public key.

9. The method of claim 8, wherein signing the secure summary information is performed in a secure subsystem implemented using a tamper-proof hardware.

10. The method of claim 7, wherein the signature of each object includes a timestamp indicating the time of creation of the data object.

11. The method of claim 8, wherein the secure summary information is maintained inside a secure subsystem; and wherein the secret key is generated inside the secure subsystem during initialization and is not accessible outside the secure subsystem as the public key is published.

12. The method of claim 10, wherein the signature of each object includes a retention period indicating the time at which the object becomes eligible for removal.

13. A computer program product having a plurality of executable instruction codes stored on a storage medium, for migrating data objects from a source system to a target system, comprising:

a program code for maintaining secure summary information of the data objects including past and current data objects, comprising hashes, at the source system;

a program code for receiving a request to migrate the data objects to a target system;

a program code for sending the data objects from the source system to the target system;

a program code for sending the maintained secure summary information from the source system to the target system;

a program code for calculating summary information of the data objects received at the target system;

a program code for signing a first data object from one of the migrating data objects by a trust source agent;

a program code for creating a summary of signatures for the first data object that was signed by the trust source agent;

a program code for using a mathematical function to generate a unique value for the summary of signatures for a group of the migrating data objects;

a program code for maintaining the summary of signatures for the first data object within the trust source agent;

a program code for comparing summary information from past and present data objects with a public key for verifying integrity of the past and present data objects;

a program code for comparing the calculated summary information with the secure summary information received at the target system to verify the integrity and completeness of the data objects received at the target system; and a program code for preventing the secure summary information from being replayed, and calibrating clocks on the source system and target system, by sending a time-stamped, challenge and response protocol communication between the source system and the target system.

14. The computer program product of claim 13, wherein the secure summary information maintained at the source system is a function of the signature of the data objects that the summary information covers; and wherein the signature of each data object is based on a secure one-way hash of the content and associated attributes of the data object.

15. The computer program product of claim 13, wherein the secure summary information is maintained inside a secure subsystem in the source system so that the summary information is protected from tampering.

16. The computer program product of claim 13, wherein the summary information for the data objects received by the target system is included in a system secure summary information on the target system for subsequent migration of data from the target system.

17. The computer program product of claim 13, wherein the data objects at the source system are partitioned into groups; and wherein a separate secure summary information is maintained for each group.

18. The computer program product of claim 13, wherein the secure summary information maintained at the source system is calculated cumulatively as data objects are added.

19. The computer program product of claim 14, wherein the secure summary information maintained at the source system includes the signature for each data object no longer present on the source system.

20. A computer processor-implemented system for migrating data objects from a source system to a target system, comprising:

the source system maintaining secure summary information of the data objects, including past and current data objects, comprising hashes;

the source system grouping together hash values of the migrating data objects using the computer processor;

the source system signing the hash values of the migrating data objects in batches;

the source system creating a summary of signatures for the signed hash values of the migrating data objects;

the source system receiving a request to migrate the data objects to the target system;

the source system sending the data objects to the target system;

sending the maintained secure summary information from the source system to the target system;

the target system calculating a summary information of the data objects received at the target system;

the target system comparing summary information from past and present data objects with a public key for verifying integrity of the past and present data objects; and the target system comparing the calculated summary information with the secure summary information received at the target system, to verify the integrity and completeness of the data objects received at the target system; and the source system and target system preventing the secure summary information from being replayed, and calibrating clocks on the source system and target system, by sending a time-stamped, challenge and response protocol communication between the source system and the target system.

21. The system of claim 20, wherein the secure summary information maintained at the source system is a function of a signature of the data objects covered by the summary information; and wherein the signature of each object of the data objects is based on at least a secure one-way hash of a content and associated attributes of the object.

22. The system of claim 20, wherein the secure summary information is maintained inside at least one secure subsystem in the source system so that the secure summary information is protected from tampering even if the content of the source system, other than the secure subsystem, is compromised.

23. The system of claim 20, wherein the summary information for the data objects received by the target system is included in a system secure summary information on the target system for subsequent migration of data from the target system.

24. The system of claim 20, wherein the data objects at the source system are partitioned into groups; and wherein a separate secure summary information is maintained for each group.

* * * * *

UNITED STATES PATENT AND TRADEMARK OFFICE
CERTIFICATE OF CORRECTION

PATENT NO. : 7,996,679 B2  Page 1 of 1
APPLICATION NO. : 11/243560
DATED : August 9, 2011
INVENTOR(S) : Windsor Wee Sun Hsu and Xiaonan Ma It is certified that error appears in the above-identified patent and that said Letters Patent is hereby corrected as shown below:

Title page, item [74] should read as follows: Shimokaji & Associates, P.C.

Signed and Sealed this
Fourth Day of September, 2012

David J. Kappos
*Director of the United States Patent and Trademark Office*